United States Patent [19]

Andrews

[11] 4,293,674

[45] Oct. 6, 1981

[54] DIENYL METHACRYLATES

[75] Inventor: Gerald D. Andrews, Hockessin, Del.

[73] Assignee: E. I. Du Pont de Nemours and Company, Wilmington, Del.

[21] Appl. No.: 155,978

[22] Filed: Jun. 3, 1980

[51] Int. Cl.$^3$ .................. C08F 20/40; C07C 67/03; C08F 118/12
[52] U.S. Cl. .................................. 526/327; 560/217
[58] Field of Search ............... 526/322, 327; 560/217, 560/1

[56] References Cited

U.S. PATENT DOCUMENTS

| | | | |
|---|---|---|---|
| 3,476,722 | 11/1969 | Schlatzer | 526/327 |
| 3,520,839 | 7/1970 | Milligan et al. | 560/217 |
| 4,133,793 | 1/1979 | Lewis et al. | 526/327 |

*Primary Examiner*—John Kight, III

[57] ABSTRACT

Compound of the formula $CH_2=C(CH_3)CO_2R$ wherein R is an alkadienyl or cycloalkadienyl group which contains the 1,3- or 1,4-diene carbon skeleton, homopolymers and copolymers of the compound, and curable finishes containing the homopolymer and/or copolymer.

16 Claims, No Drawings

DIENYL METHACRYLATES

DESCRIPTION

1. Technical Field

This invention relates to dienyl esters of methacrylic acid, to homopolymers and copolymers thereof, and to curable finishes containing the homopolymers and/or copolymers.

2. Background

Mono-unsaturated esters of methacrylic acid are well known in the art. For example, Schildknecht, in "Vinyl and Related Polymers" (Wiley, 1952), discusses art relative to esters such as vinyl methacrylate, allyl methacrylate, and crotyl methacrylate. Di-unsaturated esters of methacrylic acid likewise are known in the art, but to a lesser extent than the mono-unsaturated esters. U.S. Pat. No. 3,746,748 discloses geranyl methacrylate, $(CH_3)_2C=CH(CH_2)_2C(CH_3)=CHCH_2-OOCC(CH_3)=CH_2$; U.S. Pat. No. 3,787,484 discloses bis carboxylates of the formula $R'COO-CH=CHCH_2CH_2CH=CH-OOCR'$ wherein $R'$ is $CH_2=C(CH_3)-$; and U.S. Pat. No. 3,997,577 discloses compounds of the formula

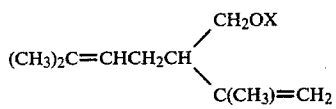

wherein X is the acyl radical of methacrylic acid. In each of these di-unsaturated esters the two ethylenic moieties are separated by two carbons; thus, the di-unsaturation is present as a 1,5-diene system. No polymers of these di-unsaturated esters are disclosed.

It is an object of the present invention to provide two new types of dienyl methacrylates as well as homopolymers and copolymers thereof, which polymers can be cured rapidly in air to give superior finishes. Other objects will become apparent hereinafter.

DISCLOSURE OF INVENTION

For further comprehension of the invention and of the objects and advantages thereof reference may be made to the following description and to the appended claims in which the various novel features of the invention are more particularly set forth.

The invention resides in an ester of a dienol and methacrylic acid, and to homopolymers and copolymers of the ester which is also referred to herein as a dienyl methacrylate. The dienyl methacrylates of the invention are alkadienyl and cycloalkadienyl methacrylates containing a 1,3- or 1,4-diene carbon skeleton, that is, C=C—C=C or C=C—C—C=C. These skeletons correspond to conjugated and "homoconjugated" systems. More specifically, the invention resides in compounds of the formula $CH_2=C(CH_3)CO_2R$ wherein R is an alkadienyl or cycloalkadienyl group which contains the 1,3- or 1,4-diene carbon skeleton.

The term "alkadienyl" is intended to refer to a diene system that is entirely aliphatic. Thus, it excludes, for example, the known compound cinnamyl methacrylate, in which one of the double bonds in a 1,3-diene system is supplied by carbon-carbon unsaturation of the benzene ring. The same exclusion applies to the cycloalkadienyl groups in the products of the invention.

The term "cycloalkadienyl" is intended to include cycloalkadienyl groups, per se, that is, such groups bonded through a ring carbon atom, and cycloalkadienylalkyl groups, in which the bonding is through an acyclic carbon atom. The latter type is a preferred cycloalkadienyl group.

The alkadienyl groups in the alkadienyl methacrylates of the invention can be straight-chain or branched-chain groups. The diene unsaturation can be entirely in the principal chain or partly in the principal chain and partly in the branched chain. Similarly, the diene unsaturation in the cycloalkadienyl methacrylates of the invention can be entirely in the cyclic moiety or partly in the cyclic moiety and partly in the acyclic moiety attached to the ring. In the case of the 1,4-dienyl group, the saturated carbon between the two carbon-carbon double bonds is bonded to at least one hydrogen atom.

The alkadienyl or cycloalkadienyl group can be primary, secondary, or tertiary, that is, the carbon atom bonded to the ester oxygen can bear two, one, or zero hydrogen atoms, respectively. Preferably, because of ease of preparation of the dienyl methacrylate by the method of choice, as described below, the dienyl group is primary or secondary, and, more preferably, primary. The alkadienyl group contains at least four and, preferably, at least five carbon atoms. The cyclic portion of the cycloalkadienyl group, preferably, contains five to about eight carbon atoms and, more preferably, six carbon atoms. The upper limit on carbon content of either group is determined only by the availabilty of the requisite starting materials. Usually, the dienyl group contains, at most, about twenty carbon atoms. Because of the more ready availability of starting materials, alkadienyl methacrylates are preferred.

As is well known, unsymmetrical compounds containing carbon-carbon double bonds can exist as geometric isomers. The alkadienyl groups in the alkadienyl methacrylates of the invention, therefore, can be cis, cis; cis, trans; trans, trans; or mixtures of these types.

The dienyl methacrylates of the invention can be prepared by conventional ester-interchange methods from suitable dienols and alkyl methacrylates. In a typical preparation, the dienol having the desired alkadienyl or cycloalkadienyl group is heated with methyl methacrylate in the presence of tetraisopropyl titanate (titanium tetraisopropoxide), which acts as an ester-interchange catalyst. The methanol which is formed as a by-product is removed by distillation, and the dienyl methacrylate is isolated by distillation or other conventional means. Such preparations are illustrated in Examples 1–7. By methods such as illustrated in Examples 1–7 other dienols can be converted to the corresponding dienyl methacrylates of the invention. Examples of such dienols and dienyl methacrylates are shown in the following table. The dienols and dienyl methacrylates are arbitrarily named as derivatives of the alcohol with the longest possible chain containing preferably both or at least one of the carbon-carbon double bonds.

TABLE 1

| Dienol | Dienyl Methacrylate |
| --- | --- |
| 2,4-Pentadienol | 2,4-Pentadienyl methacrylate |
| 2-Methylene-3-butenol | 2-Methylene-3-butenyl methacrylate |
| 2,5-Hexadienol | 2,5-Hexadienyl methacrylate |
| 2-Methyl-2,4-pentadienol | 2-Methyl-2,4-pentadienyl methacrylate |
| 5-Methyl-2,4-hexadienol | 5-Methyl-2,4-hexadienyl methacrylate |
| 2,5-Heptadienol | 2,5-Heptadienyl methacrylate |
| 2,5-Dimethyl-2,4-hexa- | 2,5-Dimethyl-2,4-hexadienyl |

TABLE 1-continued

| Dienol | Dienyl Methacrylate |
|---|---|
| dienol | methacrylate |
| 4-Ethyl-2,4-hexadienol | 4-Ethyl-2,4-hexadienyl-methacrylate |
| 2,3,4-Trimethyl-2,4-hexadienol | 2,3,4-Trimethyl-2,4-hexadienyl methacrylate |
| 3-Ethylidene-5-methyl-4-hexenol | 3-Ethylidene-5-methyl-4-hexenyl methacrylate |
| 2-Ethyl-3,5-dimethyl-2,4-hexadienol | 2-Ethyl-3,5-dimethyl-2,4,-hexadienyl methacrylate |
| 2,4-Diethyl-2,4-octadienol | 2,4-Diethyl-2,4-octadienyl methacrylate |
| 2,4-Diisopropyl-7-methyl-2,4-octadienol | 2,4-Diisopropyl-7-methyl-2,4-octadienyl methacrylate |
| 10,12-Hexadecadienol | 10,12-Hexadecadienyl methacrylate |
| 6-Methyl-1,3-cyclohexadienylmethanol | 6-Methyl-1,3-cyclohexadienylmethyl methacrylate |
| 2-Methyl-4-(2,6,6-trimethylcyclohexenyl)-2-butenol | 2-Methyl-4-(2,6,6-trimethylcyclohexenyl)-2-butenyl methacrylate |

Both the alkadienyl methacrylates and the cycloalkadienyl methacrylates of the invention can be homopolymerized using known techniques for conducting anionic polymerizations. Moreover, they can be copolymerized with one or more methacrylates (methacrylic acid esters) that are capable of undergoing anionic polymerization. Such methacrylates include alkyl methacrylates, such as methyl, ethyl, propyl, butyl, sec-butyl, t-butyl, hexyl, octyl, 2-ethylhexyl, decyl, or dodecyl methacrylate; dialkylaminoalkyl methacrylates, such as 2-dimethylaminoethyl or 2-diethylaminoethyl methacrylate; alkoxyalkyl methacrylates, such as 2-methoxyethyl, 2-ethoxyethyl, or 2-butoxyethyl methacrylate; and fluoroalkyl methacrylates, such as 1H,1H,5H-perfluoropentyl or 2,2,2-trifluoroethyl methacrylate. Also included are methacrylates that can be easily hydrolyzed after copolymer formation to provide pendent carboxy groups, for example, triphenylmethyl or trimethylsilyl methacrylate. Pendent carboxy groups in acrylic polymers increase the stability of water-based coating compositions, as is well known in the art. The indirect formation of such pendent carboxy groups in the copolymer, that is, by hydrolysis after copolymerization, provides a useful preparative route to a copolymer which cannot be formed directly from methacrylic acid by means of anionic polymerization, since methacrylic acid does not appear to be readily polymerizable by such means. The use of a dialkylaminoalkyl methacrylate provides improved adhesion of the resultant copolymer to a substrate, as is well known in the art.

Both block copolymers and random copolymers can be made. The polymerization can be carried out using any commonly-available, known anionic polymerization initiator, for example, 1,1-diphenylhexyllithium (preparable in situ from n-butyllithium and 1,1-diphenylethylene). Such polymerizations are illustrated in Examples 8-20. By methods such as illustrated in Examples 8-20 the dienyl methacrylates shown in Table 1 can be converted to useful polymers.

In carrying out the copolymerization the comonomers can be used in any desired proportions. For air-drying finishes, terpolymers of a dienyl methacrylate, methyl methacrylate, and butyl methacrylate are particularly useful. In making up comonomer mixtures for such a terpolymer, the amount of dienyl methacrylate is adjusted to give the desired curing behavior in the polymer, and the amounts of methyl methacrylate and butyl methacrylate are adjusted to give the desired glass-transition temperature ($T_g$), usually about room temperature or somewhat lower.

As is well known to one skilled in the art, the molecular weights of homopolymers and copolymers made by anionic polymerization can be controlled within fairly narrow limits by varying the concentration of the anionic initiator. Under ideal conditions the DP (degree of polymerization) is equal to the concentration of monomer or comonomers divided by the concentration of the initiator. The molecular weights of the homopolymers and copolymers of the dienyl methacrylates of this invention can be adjusted to be as low as about 1000-2000 or as high as about 100,000 or higher. For low molecular weights, relatively high dienyl methacrylate contents in the copolymers are required for good curing behavior. For air-drying finishes, there is little advantage in substantially exceeding number-average molecular weight ($\overline{M}_n$) of about 40,000 and/or weight-average molecular weights ($\overline{M}_w$) of about 80,000, since these molecular weights are in the lacquer range, where no chemical curing is required.

The following examples are intended to illustrate various embodiments of the invention. Examples 1-7 demonstrate the preparation of dienyl methacrylates, Examples 8-19 demonstrate the preparation of copolymers of dienyl methacrylates, Example 20 demonstrates the preparation of a dienyl methacrylate homopolymer, and Examples 21-24 demonstrate that the polymers of the invention are useful as vehicles for air-drying finishes. The finishes cure rapidly in air at room temperature or above to give hard, clear glossy films (the one exception was a copolymer containing combined 2,5-cyclohexadienylmethyl methacrylate, the product of Example 6; this copolymer did not appear to cure in air). Experiment 1 shows, for comparison with Examples 21-23, the curing behavior of a copolymer of allyl methacrylate, a known monounsaturated methacrylate.

EXAMPLE 1

2,4-Hexadienyl (Sorbyl) Methacrylate 2,4-Hexadienol (as a mixture of isomers) was prepared by reduction of 2,4-hexadienal with lithium aluminum hydride, bp 74°-75° C./10 mm.

A 2-neck 500-ml flask equipped with a thermometer probe, a stir-bar and a 2.3×30 cm vigreux column with variable-ratio take-off head was charged with 2,4-hexadienol (40.25 g, 0.41 mol), methyl methacrylate (175 mL, 1.65 mol), and phenothiazine (1.0 g). The mixture was distilled at a fairly high reflux ratio under a nitrogen atmosphere until no more water appeared in the fresh distillate. Tetraisopropyl titanate (2.0 mL) was added, and the reflux ratio was adjusted to give an initial head temperature of 66° C.

In 1.5 h about 50 mL of distillate was collected, bp 66°-96° C. The pot was cooled and the residual methyl methacrylate was distilled at 39° C./70 mm. The residue was vacuum-distilled, bp 52°-48° C./1.2-0.5 mm, to give 48.72 g (71%) of clear colorless 2,4-hexadienyl methacrylate. HPLC (high-performance) liquid chromatography) analysis (silica-gel column, methylene chloride:hexane:isopropyl alcohol 1:1:0.001, UV detector at 254 nm) showed less than 0.1% 2,4-hexadienol in the product. IR (film): $\nu$ 3058, 2985, 1721, 1664, 1640, 1156 cm$^{-1}$. UV (isooctane): $\lambda_{max}$ 227 nm, $\epsilon$=30,000. 220 MHz $^1$H NMR: revealed the presence of two isomers; major isomer δ 6.22 (1H, d of d, J=10, 15, vinyl), 6.08 (1H, bs, methacrylate vinyl), 6.0 (1H, m, vinyl), 5.8–55 (2H, m, vinyl), 5.51 (1H, m, methacrylate vinyl), 4.62 (2H, d, J=6, —OCH$_2$—), 1.93 (3H, bs, methacrylate methyl), and 1.74 (3H, d, J=6, allylic methyl); minor isomer (ca. 14%), δ 6.59 (d of d, J=10, 14, vinyl) and 4.68 (d, J=6, OCH$_2$—). 22.63 MHz $^{13}$C NMR: major isomer δ 166.9, 136.6, 134.7, 130.8 (probably 2 carbons), 125.2, 124.2, 65.1, 18.3, and 18.1.

Anal Calcd for C$_{10}$H$_{14}$O$_2$: C, 72.26; H, 8.49; P+, 166.0993 (P+ represents mass of molecular ion by mass spectrometry). Found: C, 72.05; H, 8.61; P+, 166.0975.

The above procedure was repeated on a 2.3-mole scale, except that pure trans, trans-2,4-hexadienol was used instead of the mixture of isomers, to produce trans, trans-2,4-hexadienyl methacrylate (69% yield).

EXAMPLE 2 trans, trans-2,4-Octadienyl Methacrylate

The method of Example 1 was substantially repeated with trans, trans-2,4-octadien-1-ol (50.0 g, 0.40 mol), methyl methacrylate (170 mL, 1.6 mol), phenothiazine (1.0 g) and tetraisopropyl titanate (2.0 mL). After a 2-h reaction time the methyl methacrylate was distilled at 70 mm, and the product, at 73° C./0.25 mm, to give 60.3 g (78%) of clear, colorless liquid trans, trans-2,4-octadienyl methacrylate. IR (film): ν 2985, 1712, 1631, 1449, 1310, 1287, 1149, 985, 962, 935, 811 cm$^{-1}$. UV (isooctane): λ$_{max}$ 230 nm, ε=33,000. 90 MHz $^1$H NMR: δ 6.4–5.4 (6H, m, vinyl), 4.6 (2H, d, J=7, OCH$_2$—), 2.05 (2H, q, J=7, allylic CH$_2$), 1.92 (3H, m, allylic CH$_3$), 1.4 (2H, hextet, J=7, CH$_3$C$\underline{H}_2$CH$_2$—), 0.90 (3H, t, J=7, C$\underline{H}_3$CH$_2$—). 22.63 MHz $^{13}$C NMR: δ 166.9, 136.6, 136.2, 134.8, 129.6, 125.2, 124.3, 65.1, 34.8, 22.4, 18.3, 13.6.

Anal Calcd for C$_{12}$H$_{18}$O$_2$: C, 74.19; H, 9.34; P+, 194.1305. Found: C, 73.63, 74.63, 74.01; H, 9.11, 9.25, 9.16; P+, 194.1301.

EXAMPLE 3 trans, trans-2,4-Decadienyl Methacrylate

The method of Example 1 was substantially repeated with trans, trans-2,4-decadien-1-ol (50.0 g, 0.32 mol), methyl methacrylate (140 mL, 1.3 mol), phenothiazine (1 g), and tetraisopropyl titanate (2 mL). After a 2-h period the excess methyl methacrylate was removed and the product was distilled to give 46.4 g (65% yield) of clear, colorless liquid trans, trans-2,4-decadienyl methacrylate, bp 96°–97° C./0.2 mm. IR (film): ν 2932, 1712, 1629, 1449, 1309, 1285, 1149, 984, 962, 933, 810 cm$^{-1}$. UV (isooctane): λ$_{max}$ 230 nm, ε=29,000. 90 MHz $^1$H NMR: δ 6.4–5.4 (6H, m, vinyl), 4.63 (2H, d, J=7, OCH$_2$), 2.10 (2H, q, J=7, allylic CH$_2$), 1.97 (3H, m, allylic CH$_3$), 1.3 (6H, m, 3CH$_2$), and 0.90 (3H, t, J=6, C$\underline{H}_3$CH$_2$). 22.63 MHz $^{13}$C NMR: δ 166.9, 136.5, 134.8, 129.4, 125.2, 124.3, 65.1, 32.7, 31.5, 29.0, 22.6, 18.3, 14.0.

Anal Calcd for C$_{14}$H$_{22}$O$_2$: C, 75.63; H, 9.97; P+, 222.1619. Found: C, 75.82; H, 9.88; P+, 222.1628.

EXAMPLE 4 trans-4,7-Octadienyl Methacrylate trans-4,7-Octadienol (bp 100°–102° C./20 mm) was prepared in 92% yield by lithium aluminum hydride reduction of ethyl trans-4,7-octadienoate, which was prepared in 87% yield via the Claisen orthoester rearrangement of 1,5-hexadien-3-ol by the method of Johnson et al., *J. Am. Chem. Soc.*, 92, 741 (1970).

The method of Example 1 was substantially repeated, except that a shorter vigreux head (15 cm) was used, with trans-4,7-octadien-1-ol (18.53 g, 0.146 mol), methyl methacrylate (58.8 g, 0.59 mol), phenothiazine (0.5 g), and tetraisopropyl titanate (1.0 mL). When the head temperature rose to 96° C. (pot 117° C.), the methyl methacrylate was removed at 70 mm and the product was distilled to give 24.8 g (87% yield) of clear, colorless liquid trans-4,7-octadienyl methacrylate, bp 64°–65° C./0.2 mm. IR (film): ν 2950, 1712, 1629, 1445, 1311, 1287, 1156, 964, 933, 907, 810 cm$^{-1}$. UV (isooctane): end absorption. 220 MHz $^1$H NMR: δ 6.06 (1H, bs, methacrylate vinyl), 5.76 (1H, m, —$\underline{H}$C=CH$_2$), 5.50 (1H, m, methacrylate vinyl), 5.41 (2H, m, —$\underline{H}$C=C$\underline{H}$—), 5.02–4.92 (2H, m, —HC=C$\underline{H}_2$), 4.11 (2H, t, J=6, OCH$_2$—), 2.72 (2H, m, doubly allylic CH$_2$), 2.10 (2H, m, allylic CH$_2$), 1.95 (3H, m, allylic CH$_3$), and 1.73 (2H, pentet, J=6, OCH$_2$C$\underline{H}_2$CH$_2$). 22.63 MHz $^{13}$C NMR: δ 167.2, 137.1, 136.7, 130.2, 128.9, 124.9, 115.0, 64.1, 36.8, 29.1, 28.6, 18.3.

Anal Calcd for C$_{12}$H$_{18}$O$_2$: C, 74.19; H, 9.34; P+, 194. Found: C, 74.49; H, 9.11; P+, 194.

EXAMPLE 5

1,3-Cyclohexadienylmethyl Methacrylate 1,3-Cyclohexadienylmethanol was prepared by the method of Mock and McCausland, *J. Org. Chem.*, 41, 242 (1976).

The method of Example 1 was substantially repeated with 1,3-cyclohexadienylmethanol (20.49 g, 0.182 mol), methyl methacrylate (73.0 g, 0.73 mol), phenothiazine (0.1 g), and tetraisopropyl titanate (1.0 mL). After 1.5 h the head temperature had risen to 98° C. The excess methyl methacrylate was removed at 70 mm and the product was distilled to give 23.99 g (72% yield) of colorless liquid 1,3-cyclohexadienylmethyl methacrylate, bp 56° C./0.1 mm to 43° C./0.05 mm. IR (film): ν 3067, 2950, 1715, 1633, 1449, 1311, 1287, 1149, 1058, 1006, 935, 862, 810, 746 cm$^{-1}$. UV (isooctane): λ$_{max}$ 261 nm, ε=7090. 90 MHz $^1$H NMR: δ 6.10 (1H, m, methacrylate vinyl), 5.9–5.6 (3H, m, vinyl), 5.5 (1H, m, methacrylate vinyl), 4.60 (2H, s, OCH$_2$), 2.2 (4H, m, C$\underline{H}_2$C$\underline{H}_2$), and 1.97 (3H, m, allylic CH$_3$). 22.63 MHz $^{13}$C NMR: δ 166.6, 136.6, 133.1, 126.2, 125.2, 124.0, 121.9, 67.5, 23.7, 22.7, 18.3.

Anal Calcd for C$_{11}$H$_{14}$O$_2$: C, 74.13; H, 7.92; P+, 178.0994; (P-2)+, 176.0836 ((P-2)+ represents mass of molecular ion after loss of two hydrogens). Found: C, 74.10; H, 8.04; P+, 178.1001; (P-2)+, 176.0846 (178:176, 4:1).

EXAMPLE 6

2,5-Cyclohexadienylmethyl Methacrylate 2,5-Cyclohexadienylmethanol was prepared by the method of Nelson et al., *J. Am. Chem. Soc.*, 83, 210 (1961).

The method of Example 1 was substantially repeated with 2,5-cyclohexadienylmethanol (40.86 g, 0.37 mol, containing ca. 13% 2-cyclohexenylmethanol), methyl methacrylate (159 mL, 1.5 mol), phenothiazine (0.1 g), and tetraisopropyl titanate (2.0 mL). The excess methyl methacrylate was distilled at 70 mm and the product was distilled to give 57.5 g (87% yield) of clear, colorless liquid 2,5-cyclohexadienylmethyl methacrylate, bp 58° C./0.15 mm to 54° C./0.12 mm. IR (film): ν 3030, 2941, 1709, 1629, 1445, 1309, 1287, 1152, 1009, 979, 934, 873, 810 cm$^{-1}$. 220 MHz $^1$H NMR: δ 6.07 (1H, m, methacrylate vinyl), 5.8 (2H, m, vinyl), 5.6 (2H, m, vinyl), 5.50 (1H, m, methacrylate vinyl), 4.04 (2H, d, J=6), 3.1 (1H, m, allylic methine), 2.6 (2H, M, allylic methylene), and 1.93 (3H, m, allylic CH$_3$); the minor impurity of cyclohexenylmethyl methacrylate showed a broad envelope of signals from δ 2.0 to 1.3 and a 6 Hz doublet (—CH$_2$O) at 4.02 which showed it to be 13% of the mixture. 22.63 MHz $^{13}$C NMR: δ 167.1, 137.7, 126.3, 125.4, 125.2, 68.0, 35.7, 26.5, 18.3.

Anal Calcd for 13% C$_{11}$H$_{16}$O$_2$+87% C$_{11}$H$_{14}$O$_2$: C, 74.02; H, 8.05; for C$_{11}$H$_{14}$O$_2$: P+, 178.0993; for C$_{11}$H$_{12}$O$_2$: (P-2)+, 176.0837. Found: C, 74.32, 74.13; H, 8.09, 8.13; P+, 178.0977; (P-2)+, 176.0843.

EXAMPLE 7 cis,cis-9,12-Octadecadienyl (Linoleyl) Methacrylate

The method of Example 1 was substantially repeated with cis,cis-9,12-octadecadien-1-ol (25.0 g, 9.38 mmol), methyl methacrylate (40 mL, 38 mmol), phenothiazine (0.1 g), and tetraisopropyl titanate (1 mL). When the head temperature rose to 99° C. (pot 112° C.), the reaction mixture was cooled. The material was filtered through activity grade I alumina (30 g, Woelm), and the column was rinsed with ethyl acetate. The combined filtrates were concentrated on a rotary evaporator, finally down to 0.5 mm, to give 32.4 g of light-yellow cis,cis-9,12-octadecadienyl methacrylate. Analysis by HPLC (dichloromethane:ethyl acetate:isopropyl alcohol, 90:10:1, silica gel column) showed that no unreacted octadecadienol was present. 90 MHz $^1$H NMR: δ 6.03 (1H, broad s, methacrylate vinyl), 5.47 (1H, m, methacrylate vinyl), 5.30 (4H, m, vinyl), 4.09 (2H, t, J=7, OCH$_2$), 2.75 (2H, broad t, J~6, doubly allylic CH$_2$), 2.2-1.1 (27H, m), and 0.89 (3H, t, J~6, —CH$_2$CH$_3$). The NMR spectrum indicated the presence of about 10 mole % methyl methacrylate.

A sample of the product (6 g) was purified by preparative-scale HPLC and analyzed.

Anal Calcd for C$_{22}$H$_{38}$O$_2$: C, 78.99; H, 11.45; P+, 334.2870. Found: C, 76.03, 75.95; H, 10.95; 11.14; P+, 334.2864.

The low C and H values and the presence of hydroxyl absorption in the infrared spectrum indicate that the product had reacted with atmospheric oxygen between the end of the preparation and the analysis (about 10 days). During this time the main sample had solidified in a bottle in the presence of air. This oxidation can be prevented by storing the product under nitrogen with phenothiazine as a polymerization inhibitor.

EXAMPLE 8

2,4-Hexadienyl Methacrylate/Butyl Methacrylate/Methyl Methacrylate (15/57/28 molar) Random Copolymer All glassware was oven-dried at 150° C. for at least four hours before use. The apparatus was assembled while hot and flushed with dry argon until cool; the polymerization reaction was conducted under a positive pressure of argon. The tetrahydrofuran was freshly distilled from benzophenone/sodium. Diphenylethylene was distilled and stored under argon in a refrigerator.

Freshly distilled 2,4-hexadienyl methacrylate (bp 38° C./0.07 mm, 17.46 g, 0.105 mol), butyl methacrylate (bp 66° C./20 mm, 56.88 g, 0.400 mol), and methyl methacrylate (bp 101° C., 19.55 g, 0.195 mol) were mixed, filtered through 10 g of activity grade I neutral alumina (Woelm®), and sparged with a slow stream of argon for 15 minutes.

Meanwhile, a 500-mL, 4-neck flask equipped with a glass mechanical stirrer, thermometer probe, and rubber serum cap was charged with tetrahydrofuran (THF; 300 mL) and 1,1-diphenylethylene (0.8 mL, 4.5 mmol) via syringe. With stirring throughout, the solution was cooled to about 5° C., and n-butyllithium (1.5 M in hexane, 3.0 mL, 4.5 mmol) was added via syringe. The blood-red solution was cooled to −78° C. in a dry-ice-acetone bath. The monomer mixture (74 mL, 0.5 mol, 67.1 g) was added dropwise from a syringe over 15 minutes while the temperature of the solution remained at about −70° C. After the first few drops of monomer were added, the color of the solution faded to light yellow and remained that way during the rest of the addition. After monomer addition, the solution was stirred 15 minutes. Acetic acid (0.5 mL, 8 mmol) was added, and the clear colorless solution was stirred overnight as it gradually warmed to room temperature. The solution was suction-filtered through Celite® diatomaceous filter-aid in a medium porosity Buchner funnel and concentrated to 100.4 g (68% solids) on a rotary evaporator. The residue was diluted with butyl Cellosolve® (butyl 2-hydroxyethyl ether; 70 g) to make a 40% solution for preparation of test films. A portion of this solution (10 g, containing a small amount of phenothiazine to inhibit gelation) was poured into 500 mL of rapidly stirred water, and the resulting solid was isolated by suction filtration through a medium-porosity Buchner funnel. The solid was dried in a vacuum desiccator at 0.5 mm overnight. 90 MHz $^1$H NMR (10 w/w % in CDCl$_3$): δ 7.1 (broad s, phenyl, integral 1.8), 6.4-5.4 (m, vinyl integral 11), 4.43 (broad d, J=6, —OCH$_2$CH—, integral 5), 3.93 (broad t, J~6, —OCH$_2$CH$_2$—, integral 18), 3.77 (broad s, —OCH$_3$, integral 16), and 2.2-1.4 (m, remaining protons, integral 163); these integrals correspond to a 2,4-hexadienyl methacrylate/butyl methacrylate/methyl methacrylate (15/53/32) copolymer having a DP (degree of polymerization) of 94. The calculated DP for ideal conditions (mmol monomers/mmol initiator) is 110. $\overline{M}_n$ by GPC (gel-permeation chromatography) was 13,000, $\overline{M}_w$ 14,000, PDI (poly dispersity index) 14,000/13,000=1.09. $T_g$ by DSC (glass-transition temperature by differential scanning calorimetry; four heats, 10° C./min under N$_2$) was 23° C.

EXAMPLES 9–18

Dienyl Methacrylate/Methyl Methacrylate Random Copolymers

Other dienyl methacrylate/methyl methacrylate copolymers were prepared by substantially the method of Example 8. These preparations and the properties of the products are summarized in the following table. The data for Example 8 are included for comparison. The column identified "Feed" shows the mole % of each comonomer in the feed. The column identified "Polymer" shows the mole % of the various comonomer units in the product as estimated by NMR analysis.

TABLE 2

| Ex. | Methacrylate | Feed | Polymer | DP Calc | DP Obs | $\overline{M_w}/\overline{M_n}$ | $T_g$ |
|---|---|---|---|---|---|---|---|
| 8 | 2,4-Hexadienyl | 15 | 15 | | | | |
| | Butyl | 57 | 53 | 100 | 94 | 14,000/13,000 | 23° C. |
| | Methyl | 28 | 32 | | | | |
| 9 | 2,4-Hexadienyl | 15 | 16 | | | | |
| | Butyl | 57 | 55 | 56 | 74 | 11,000/7,500 | 38° C. |
| | Methyl | 28 | 29 | | | | |
| 10 | 2,4-Hexadienyl | 20 | 17 | | | | |
| | 1H,1H,2H,2H-per-fluoro-n-octyl | 80 | 83 | 25 | 21 | — | — |
| 11 | 2,4-Hexadienyl | 25 | | | | | |
| | Butyl | 40 | — | 110 | — | 17,000/14,000 | — |
| | Methyl | 35 | | | | | |
| 12 | 2,4-Hexadienyl | 15 | 18 | | | | |
| | Butyl | 57 | 56 | 110 | 101 | 18,000/13,000 | — |
| | Methyl | 28 | 26 | | | | |
| 13 | 2,4-Hexadienyl | 15 | 15 | | | | |
| | Butyl | 71 | 69 | 110 | 130 | 20,000/15,000 | 24° C. |
| | Methyl | 14 | 16 | | | | |
| 14 | 2,4-Octadienyl | 15 | 15 | | | | |
| | Butyl | 53 | 54 | 110 | 136 | 26,000/16,000 | 39° C. |
| | Methyl | 32 | 30 | | | | |
| 15 | 2,4-Decadienyl | 15 | 16 | | | | |
| | Butyl | 34 | 38 | 110 | 109 | 21,000/15,000 | 42° C. |
| | Methyl | 51 | 47 | | | | |
| 16 | 4,7-Octadienyl | 15 | 17 | | | | |
| | Butyl | 53 | 54 | 110 | 106 | 18,000/13,000 | 31° C. |
| | Methyl | 32 | 29 | | | | |
| 17 | 1,3-Cyclohexadienyl-methyl | 15 | 16 | | | | |
| | Butyl | 53 | 55 | 110 | 121 | 19,000/13,000 | 47° C. |
| | Methyl | 32 | 29 | | | | |
| 18 | 2,5-Cyclohexadienyl-methyl | 15 | 13 | | | | |
| | Butyl | 53 | 55 | 110 | 149 | 19,000/11,000 | 54° C. |
| | Methyl | 32 | 31 | | | | |
| | | 17 | | | | | |

EXAMPLE 19

2,4-Hexadienyl Methacrylate/Methyl Methacrylate (20/80 molar) Random Copolymer

All glassware and solvent were dried as in Example 8. The 2,4-hexadienyl methacrylate used was a mixture of geometric isomers, like the product of Example 1. A mixture of 2,4-hexadienyl methacrylate (16.6 g, 0.1 mol) and methyl methacrylate (42.6 g, 0.4 mol) was filtered through alumina (10 g) and sparged with argon. With stirring throughout, the monomer mixture (35.4 mL, 34.0 g, 0.3 mol) was added over 10 minutes to a solution of potassium t-butoxide (0.34 g, 3 mmol) in tetrahydrofuran (200 mL) under argon. The temperature rose gradually until it reached 36° C. after addition was complete. After one hour 2 M aqueous HCl (3.0 mL) was added and the solution was poured into 3 L of rapidly-stirred water. The copolymer was isolated by suction filtration on a medium-porosity Buchner funnel. 60 MHz $^1$H NMR: δ 6.4–5.4 (m, vinyl, integral 32), 4.5 (broad d, J=6, O-CH$_2$, integral 14), 3.61 (broad s, OCH$_3$, integral 91), 2.2–0.7 (m, integral 220); these integrals correspond to a 2,4-hexadienyl methacrylate/methyl methacrylate (19/81) copolymer.

The bulk of the sample was stored three days in a closed bottle and then dried at 0.5 mm overnight to give 30.5 g (86% yield) of copolymer. At this time it was partly insoluble in acetone.

A sample of the copolymer (2.0 g) was dissolved in acetone (2.0 g) and butyl Cellosolve ® (2.0 g) and films were cast at 0.4-mm thickness on glass plates. The solution and films contained some lumps of gelled polymer. After standing in air overnight the films were removed from the glass and found to be insoluble in acetone, indicating extensive crosslinking. The films were clear and hard.

EXAMPLE 20

Poly(2,4-hexadienyl methacrylate)

The apparatus, materials, except for the comonomers, and procedure were substantially the same as those of Example 8.

Butyllithium (6.7 mL, 10 mmol) was added to a solution of 1,1-diphenylethylene (1.8 mL, 10 mmol) in 100 ml of THF at room temperature. The dark-red solution was cooled to −78° C., and 2,4-hexadienyl methacrylate (17.7 mL, 16.6 g, 100 mmol) was added dropwise over 16 minutes at −74° C. After an additional 15 minutes acetic acid (0.7 mL, 12 mmol) and phenothiazine (100 mg) were added. A sample was withdrawn for GPC analysis, and the rest of the solution was filtered through Celite ®, concentrated on a rotary evaporator, and dried in a vacuum desiccator for three days to give 14.7 g (77%) of poly(2,4-hexadienyl methacrylate) as a colorless sticky glass. 90 MHz $^1$H NMR: $\delta$ 7.1 (m, phenyl, integral 16), 6.4–5.3 (m, vinyl, integral 78), 4.47 (d, J=6, OCH$_2$, integral 37), 2.0–0.6 (m, remaining protons including a 6 Hz doublet at 1.67, allylic CH$_3$, integral 169); these data indicate a DP of 12; GPC $\overline{M}_n$ of 1500, $\overline{M}_w$ of 2800, PDI of 1.80.

EXAMPLE 21

1. Preparation of Millbase

A 40% polymer solution was made by dissolving 68.0 g of the 2,4-hexadienyl methacrylate/butyl methacrylate/methyl methacrylate (15/57/28) copolymer of Example 12 in 31 g of tetrahydrofuran and 71 g of toluene. A screw-cap jar was charged with 11.8 g of this solution, 30.5 g of toluene, 20.0 g of sand, and 32.8 g of titanium dioxide. Nitrogen was bubbled through the mixture for about 10 minutes. The jar was flushed with nitrogen, tightly sealed, and shaken on a paint shaker for one hour. Every 10 minutes shaking was stopped and the bottle was cooled under a stream of cold water. The sand was removed by filtration through a medium-grade paint strainer to give a millbase of the following composition: 6.3% binder solid, 43.7% TiO$_2$ (693/100 pigment/binder ratio), 50.0 wt % solids.

2. Formulation of Paint

A 40% solution of the 2,4-hexadienyl methacrylate/butyl methacrylate/methyl methacrylate (15/57/28) copolymer of Example 8 in 70/30 (w/w%) toluene/tetrahydrofuran was made up as in Part 1. A paint was formulated by mixing the materials shown in Table 3; the cobalt naphthenate represents 0.1 wt % cobalt on binder solids.

TABLE 3

| Component | Total Parts | Parts Pigment | Parts Copolymer Binder |
|---|---|---|---|
| Copolymer solution | 235.63 | — | 94.25 |
| Millbase of part 1 | 91.53 | 40.00 | 5.74 |
| Cobalt Naphthenate | 1.54 | — | — |
| | 328.70 | 40.00 | 99.99 |

3. Preparation of Finishes

Film samples were prepared by drawdowns of the paint of Part 2 with an 8-mil (0.2 mm) applicator on glass plates and then dried at room temperature or baked. The properties of the films are shown in Table 4. Hardness was determined by ANSI/ASTM C 849–76; gloss values are the average of three determinations by the procedure of ANSI/ASTM D 2244–78.

TABLE 4

| | Dry Film Thickness | Hardness KHN | 20° Gloss |
|---|---|---|---|
| 24-h air-dry | ca. 2.5 mil (0.06 mm) | 6.5* | — |
| 30 min at 180° F. (82° C.) (after 30 min at room temp.) | ca. 1.8 mil (0.05 mm) | 15.5** | 58 |

EXAMPLE 22

Example 21 was substantially repeated, except that the 25/40/35 2,4-hexadienyl methacrylate/butyl methacrylate/methyl methacrylate copolymer of Example 11 was used in Part 2 in place of the 15/57/28 copolymer of Example 8. The properties of the films are shown in Table 5.

TABLE 5

| | Dry Film Thickness | Hardness KHN | 20° Gloss |
|---|---|---|---|
| 24-h air-dry | ca. 1.5 mil (0.04 mm) | 6.4 | — |
| 30 min at 180° F. (82° C.) (after 30 min at room temp.) | ca. 2.0 mil (0.05 mm) | 18.6 | 58 |

EXAMPLE 23

1. Formulation of Paint

A 50% solution of the 2,4-octadienyl methacrylate/butyl methacrylate/methyl methacrylate (15/53/32) copolymer of Example 14 was made by dissolving 68 g of copolymer in a mixture of 5 g of tetrahydrofuran, 19 g of toluene, and 44 g of butyl Cellosolve ®. A paint was formulated by mixing the materials shown in Table 6; the cobalt naphthenate represents 0.1 wt % cobalt on binder solids.

TABLE 6

| Component | Total Parts | Parts Pigment | Parts Copolymer Binder |
|---|---|---|---|
| Copolymer solution | 188.50 | — | 94.25 |
| Toluene | 47.12 | — | — |
| Millbase of Ex. 21 | 91.53 | 40.00 | 5.74 |
| Cobalt Naphthenate | 1.54 | — | — |
| | 328.69 | 40.00 | 99.99 |

2. Preparation of Finishes

Film samples were prepared as in Example 21. The properties of the films are shown in Table 7; hardness values are the averages of two determinations.

TABLE 7

| | Dry Film Thickness | Hardness KHN | 20° Gloss |
|---|---|---|---|
| 2-day air-dry | 3.0 mil (0.08 mm) | 8.2 | 40 |
| 30 min at 180° F. (82° C.) (after 20 min at room temp.) | 2.0 mil (0.05 mm) | 15.3 | 42 |

EXAMPLE 24

Cobalt naphthenate solution (0.105 mL, containing 0.005 g of cobalt) was mixed with a solution of 5.0 g of the poly(2,4-hexadienyl methacrylate) of Example 20 in 5.0 g of 70/30 butyl Cellosolve ®/toluene. The solution was spread on glass plates with an 0.2 mm applicator to give film samples. A sample air-dried at room temperature for two days was soft and soluble in toluene. A sample heated at 80° C. for 12 hours was hard (KHN 29) and insoluble in toluene and acetone.

Experiment 1

1. Preparation of Copolymer

An allyl methacrylate/butyl methacrylate/methyl methacrylate (15/74/11 molar) random copolymer was made by substantially the method of Example 8. $^1$H NMR indicated a 16/72/13 composition and a DP of 141; the calculated DP for ideal conditions is 110. $\overline{M}_n$ by GPC was 15,000, $\overline{M}_w$ was 26,000, PDI was 1.77.

2. Preparation of Finishes

The copolymer of Part 1 was dissolved in 70/30 (w/w%) butyl Cellosolve ®/toluene to give a 50% solution. To 10.0 g of this solution was added 0.105 mL of a cobalt naphthenate solution that contained 0.005 g of cobalt. Wet films of the cobalt-containing copolymer solution were made on glass plates with an 0.2-mm applicator. One film was baked in an oven at 70° C. for 24 hours. The resulting dry coating was removed from the glass and found to be very soluble in deuterochloroform. It had an $\overline{M}_n$ of 15,000, $\overline{M}_w$ of 23,000 and PDI of 1.52, and its 90-MHz $^1$H NMR spectrum showed no noticeable change from that of the original copolymer. A second coating was baked at 70° C. for four days, after which it was insoluble in acetone.

Comparison of these results with those of Examples 21–23 show that finishes from copolymers of the dienyl methacrylates of the invention cure much more readily in air than does the finish from the known allyl methacrylate.

BEST MODE FOR CARRYING OUT THE INVENTION 2,4-Hexadienyl methacrylate represents the preferred embodiment of the dienyl methacrylates of the invention, since the starting alcohol, 2,4-hexadienol, presently is commercially available and relatively cheap. The preferred embodiment of the copolymers of the invention is an approximately 15/57/28 (molar) 2,4-hexadienyl methacrylate/butyl methacrylate/methyl methacrylate copolymer which has a $T_g$ near room temperature.

INDUSTRIAL APPLICABILITY OF THE INVENTION

The industrial applicability of the invention resides especially in its usefulness in the field of curable finishes. Curable films having good hardness and gloss are readily obtainable.

Although the above description illustrates preferred embodiments of the invention, it is to be understood that there is no intent to limit the invention to the precise embodiments herein disclosed and it is to be further understood that the right is reserved to all changes and modifications coming within the scope of the invention as described herein.

I claim:

1. Compound of the formula $CH_2=C(CH_3)CO_2R$ wherein R is an alkadienyl or cycloalkadienyl group which contains the 1,4-diene carbon skeleton.

2. Compound of the formula $CH_2=C(CH_3)CO_2R$ wherein R is 2,4-octadienyl.

3. Compound of the formula $CH_2=C(CH_3)CO_2R$ wherein R is 2,4-decadienyl.

4. Compound of the formula $CH_2=C(CH_3)CO_2R$ wherein R is 4,7-octadienyl.

5. Compound of the formula $CH_2=C(CH_3)CO_2R$ wherein R is 9,12-octadecadienyl.

6. Compound of the formula $CH_2=C(CH_3)CO_2R$ wherein R is cycloalkadienyl.

7. Compound of claim 6 wherein R is 1,3-cyclohexadienylmethyl.

8. Compound of claim 6 wherein R is 2,5-cyclohexadienylmethyl.

9. Homopolymer of the compound of the formula $CH_2=C(CH_3)CO_2R$ wherein R is an alkadienyl or cycloalkadienyl group which contains the 1,3- or 1,4-diene carbon skeleton.

10. Copolymer, prepared by direct polymerization, of the compound of the formula $CH_2=C(CH_3)CO_2R$ wherein R is an alkadienyl or cycloalkadienyl group which contains the 1,3- or 1,4-diene carbon skeleton and at least one anionically polymerizable methacrylic acid ester.

11. Copolymer of claim 10 wherein the ester is methyl methacrylate.

12. Copolymer of claim 10 wherein the ester is butyl methacrylate.

13. Copolymer of claim 10 which is a terpolymer of the compound of the formula $CH_2=C(CH_3)CO_2R$ wherein R is an alkadienyl or cycloalkadienyl group which contains the 1,3- or 1,4-diene carbon skeleton, methyl methacrylate, and butyl methacrylate.

14. Copolymer of claim 13 wherein the compound of said formula is 2,4-hexadienyl methacrylate.

15. Curable composition containing the copolymer of claim 10.

16. Air-curable composition containing the copolymer of claim 13.

* * * * *

UNITED STATES PATENT OFFICE
CERTIFICATE OF CORRECTION

PATENT NO. : 4,293,674
DATED : October 6, 1981
INVENTOR(S) : Gerald Donald Andrews It is certified that error appears in the above-identified patent and that said Letters Patent are hereby corrected as shown below:

In the claims, in Claim 6, at Col. 14, line 16, after "cycloalkadienyl", insert --which contains the 1,3- or 1,4-diene carbon skeleton--.

Signed and Sealed this

Eighteenth Day of May 1982

[SEAL]

Attest:

Attesting Officer

GERALD J. MOSSINGHOFF
Commissioner of Patents and Trademarks